US00RE37270E

(19) United States

(12) Reissued Patent

Sage et al.

(10) Patent Number: US RE37,270 E

(45) Date of Reissued Patent: Jul. 10, 2001

(54) LIQUID CRYSTAL PHASE

(75) Inventors: Ian Charles Sage, Broadstone; Michael Kevin Chambers, Parkstone, both of (GB); Reinhard Hittich, Modautal; Georg Weber, Erzhausen, both of (DE)

(73) Assignee: Merck Patent Gesellschaft, Darmstadt (DE)

(21) Appl. No.: 07/803,319

(22) PCT Filed: Aug. 28, 1987

(86) PCT No.: PCT/EP87/00490

§ 371 Date: May 6, 1988

§ 102(e) Date: May 6, 1988

(87) PCT Pub. No.: WO88/02018

PCT Pub. Date: Mar. 24, 1988

Related U.S. Patent Documents

Reissue of:

(64) Patent No.: 4,886,621
Issued: Dec. 12, 1989
Appl. No.: 07/192,742
Filed: May 6, 1988

(30) Foreign Application Priority Data

Sep. 8, 1986 (GB) ..... 8621603
Jun. 5, 1987 (GB) ..... 87132208
Aug. 27, 1987 (WO) ..... PCT/EP87/00490

(51) Int. Cl.[7] ..... C09K 19/34; C09K 19/30; C09K 19/20

(52) U.S. Cl. ..... 252/299.61; 252/299.01; 252/299.5; 252/299.65; 252/299.63; 252/299.64; 252/299.66; 252/299.67; 349/182

(58) Field of Search ..... 252/299.61, 299.63, 252/299.5, 299.01, 299.64, 299.65, 299.66, 299.67; 359/103

(56) References Cited

U.S. PATENT DOCUMENTS 4,328,116 * 5/1982 Harrison ..... 252/299.63
4,405,488 * 9/1983 Sugimori et al. ..... 252/299.63
4,424,371 * 1/1984 Hsu ..... 549/373
4,472,293 * 9/1984 Sugimori et al. ..... 252/299.63
4,490,276 * 12/1984 Hsu ..... 252/299.61
4,528,116 * 7/1985 Dabrowski et al. ..... 252/299.63
4,536,321 * 8/1985 Sugimori et al. ..... 252/299.63
4,621,901 * 11/1986 Petrzuka et al. ..... 252/299.61
4,622,162 * 11/1986 Kimura et al. ..... 252/299.63
4,661,283 * 4/1987 Sugimori et al. ..... 252/299.63
4,664,840 * 5/1987 Osman ..... 252/299.63
4,670,182 * 6/1987 Fujita et al. ..... 252/299.61
4,673,756 * 6/1987 Sasaki et al. .
4,676,924 * 7/1985 Dabrowski et al. ..... 252/299.63
4,707,296 * 11/1987 Sugimori et al. ..... 252/299.67
4,710,315 * 12/1987 Schad et al. ..... 252/299.63
4,756,847 * 7/1988 Yoshida et al. ..... 252/299.61
4,776,975 * 10/1988 Sawada et al. ..... 252/299.61

FOREIGN PATENT DOCUMENTS

3606153 * 8/1987 (DE) .
8603769 * 7/1986 (WO) .

* cited by examiner

*Primary Examiner*—C. H. Kelly
(74) *Attorney, Agent, or Firm*—Millen, White, Zelano & Branigan, P.C.

(57) ABSTRACT

Liquid crystal phases containing components of the formulae I and III

I

III $R^1$—$A^3$—COO—Phe—$R^2$ have an acceptable combination of threshold steepness, viewing angle and temperature dependence at a low threshold voltage.

19 Claims, No Drawings

LIQUID CRYSTAL PHASE

Matter enclosed in heavy brackets [ ] appears in the original patent but forms no part of this reissue specification; matter printed in italics indicates the additions made by reissue.

The invention relates to liquid crystal phases (LC phases) having a particularly low threshold voltage and broad nematic phases.

BACKGROUND OF THE INVENTION

Liquid crystal display elements (LC display elements) increasingly utilize the properties of nematic or nematic-cholesteric liquid crystal materials of significantly changing their optical properties such as light absorption, light scattering, birefringence, reflectance or color under the influence of electric fields. The function of such display elements is based for example on the phenomena of dynamic scattering, the deformation of aligned phases, the guest-host effect, the Schadt-Helfrich effect in the twisted cell, or the cholesteric-nematic phase transition.

The industrial application of these effects in electronic components requires liquid crystal phases which must meet a large number of requirements. Of particular importance here are the chemical resistance to moisture, air and physical factors such as heat, radiation in infrared, visible and ultraviolet region and continuous and alternating electric fields. Industrially utilizable liquid crystal phases are also required to have a liquid crystal mesophase within a suitable temperature range, a very low viscosity, a relatively low optical anisotropy, a high steepness of the electro-optical characteristic and adequate dissolving power for pleochroic dyes. Finally, they must not have any self-absorption in the region of visible light, i.e. they must be colorless.

None of the hitherto disclosed series of compounds with a liquid crystal mesophase contain an individual compound which meets all these requirements. For that reason, the rule is to prepare mixtures of two to twenty-five, preferably three to fifteen, compounds in order to obtain substances which are usable as liquid crystal phases. Usually at least one compound having a low melting and clear point is additionally mixed. The result is normally a mixture whose melting point is below that of the lower-melting component, while the clear point is between the clear points of the components. However, optimal phases cannot be easily prepared in this way, since the components having the high melting and clear points frequently also confer on the mixtures a high viscosity. As a result the switching times of the electro-optical display elements prepared therewith are changed in an undesirable manner.

To reduce the threshold voltage, hitherto disclosed LC phases have added to them strongly polar nematic compound having a terminal cyano group. The effective dipole moment of these compounds, however, is distinctly reduced by a more or less strong antiparallel association of these molecules, so that relatively large amounts of polar compounds need to be added. This in turn gives rise to various disadvantages, such as unfavorable elastic properties of the LC phases, and high viscosity. On addition of 4-cyano-3-fluorophenyl p-alkylbenzoates as strongly polar components to ZLI-1957/5 (commercially available mixture from E. Merck, Darmstadt, containing phenylcyclohexane, cyclohexylbiphenyl, biscyclohexylbiphenyl compounds and phenyl cyclohexylbenzoates), it has been possible to show (Hp. Schad and S. M. Kelly, J. Chem. Phys. 81 (3), 1514–15 (1984)) that the threshold voltage is reduced, which is explained in terms of a reduced degree of association of the added compounds. However, even these LC phases do not meet all the abovementioned requirements at the same time.

In particular, for many applications their threshold voltages are still too high, and, in addition, the steepnesses of the electro-optic characteristic are not sufficient for highly informative displays owing to the relatively large ratio of the elastic constants for bending ($K_3$) and spreading $(K_1)K_3/K_1$. The hitherto disclosed mixtures therefore have an excessively high threshold voltage and/or an unacceptably poor steepness of characteristics (characterized by an excessively high $K_3/K_1$) and/or high temperature dependence of the threshold voltage dV/dT and/or large angular dependence of contrast.

There is thus still a great need for liquid crystal phases having high clear points, low melting points, a low viscosity (and hence short switching times) and a low threshold voltage, which at the same time have favorable electro-optic steepness and excellent viewing angle characteristics combined with a birefringence suitable for use in standard display cells.

SUMMARY OF THE INVENTION

The invention has for its object to prepare liquid crystal phases which have a nematic phase within the required temperature range and are completely or almost completely free from the abovementioned disadvantages.

It has now been found that the liquid crystal phase having particularly favorable combinations of material properties, in particular an acceptable combination of threshold steepness, viewing angle and temperature dependence at a low threshold voltage are obtained when they contain at least one component of the formula I

I

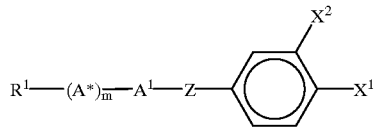

in which $R^1$ is alkyl of 1 to 12 C atoms, in which in addition one or two non-adjacent $CH_2$ groups can be replaced by 0 atoms, —CO—, —O—CO—, —CO—O— and/or —CH=CH— groups, $A^o$ and $A^1$ are each, independently of each other, Cy, Dio, Pyr or Phe, Z is —CO—O—, —O—CO—, —$CH_2$—O—, —O—$CH_2$— or a single bond, $X^1$ is F, Cl, —CN or —NCS, $X^2$ is F, Cl and in the case of $X^1$=NCS also H, m is 0 or 1, Cy is trans-1,4-cyclohexylene, Pyr is pyrimidine-2,5-diyl or pyridine-2,5-diyl, Dio is trans-1,3-dioxane-2,5-diyl and Phe is 1,4-phenylene, and at least one component of the formula III $$R^1—A^3—COO—Phe—R^2 \qquad \text{III}$$

in which $A^3$ is Cy or Phe, $R^2$ has one of the meaning of $R^1$, and $R^1$, Cy and Phe have the meanings indicated above.

The invention thus provides the above-described liquid crystal phases which may also contain one or more pleochroic dyes (guest-host systems), and the use of these phases in liquid crystal display elements.

The invention further provides liquid crystal display elements, in particular electro-optical display elements which contain such phases.

The guest-host systems according to the invention generally contain 0.1 to 15, preferably 0.5 to 10, in particular 1 to 7, percent by weight of pleochroic dyes.

The pleochroic dyes of the guest-host system according to the invention are preferably chosen in such a way that they cover a suitable part of the visible spectrum and that the absorption in this range is more or less constant.

The preparation of the guest-host systems according to the invention is effected in conventional manner. In general, the desired amounts of the various pleochroic dyes are dissolved in the host material, preferably at elevated temperature.

However, it is also possible to mix solutions of the pleochroic dye and of the host material in a suitable organic solvent, for example acetone, chloroform or methanol, and to remove the solvent after thorough mixing, for example by distillation under reduced pressure. It is self-evident that with this method it is necessary to ensure that the solvent does not introduce any contaminants or undesirable dopants.

The individual compounds of the formula I to VI of the liquid crystal phases according to the invention are either known or preparable by methods which are easily derivable by those skilled in the art from the prior art, since they are based on standard methods described in the literature.

Corresponding compounds of the formula I are described for example in German patent applications P 34 05 914 and P 35 15 633; in European patent specification No. 0,019,665; in S. M. Kelly and Hp. Schad, Helvetica Chimica Acta, 67, 1580–1587 (1984); in S. M. Kelly, ibid, 67, 1572–1579 (1984); in Japanese Offenlegungsschrift 59-191,789 and European Offenlegungsschriften 0,099,099 and 0,119,756. Compounds of the formula II are described for example in German Offenlegungsschriften 29 44 905, 31 12 185, 31 46 249, 31 50 761, 31 50 763, 32 07 114, 32 27 916, 33 02 218, 33 34 054, in European Offenlegungsschrift 0,122,389, in U.S. Pat. No. 4,322,354 and in Japanese Offenlegungsschrift 56-164,179.

It was found, surprisingly, that the combination according to the invention of compounds of the formulae I and III gives LC phases which on the one hand have wide mesophase ranges with low melting points and low smectic-nematic transition temperatures and on the other are capable of multiplexed drive at very low supply voltage by virtue of their good electro-optic steepness, viewing angle characteristic and high dielectric anisotropy.

The LC phases according to the invention preferably contain at least two components, in particular at least three components, of the formula I and at least two components, in particular at least three components, of the formula III.

The LC phases of the present invention preferably contain at least one component of the formula II $$R^1—A^2—Phe—CN \qquad II$$

in which $A^2$ is Cy, Phe, Phe—COO, Cy—COO, Phe—Phe, Phe—COO—Phe, Phe—Phe—COO—Phe, Cy—Phe or Cy—COO—Phe and $R^1$, Cy and Phe have the meanings indicated above.

Preferred LC phases contain at least one component of the formula IV and/or VI

VI

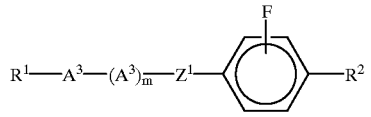

in which $Z^1$ independently is —CO—O— or —O—CO— and $R^1$, $R^2$, m and $A^3$ independently have the meanings indicated above.

Furthermore preferred are LC phases which contain at least one compound of the formula V $$R^2—Dio—A^4—(Z—A^3)_n—R^3 \qquad V$$

in which $R^2$ is alkyl of 1 to 12 C atoms, in which in addition one or two non-adjacent $CH_2$ groups can be replaced by 0 atoms, —CO—, —O—CO—, —CO—O—, and/or —CH=CH— groups, $R^3$ is alkyl of 1 to 12 C atoms, in which in addition one or two non-adjacent $CH_2$ groups can be replaced by 0 atoms, —CO—, —O—CO—, —CO—O— and/or —C=CH— groups, or is F, Cl or CN, $A^4$ and $A^3$ are each Phe or Cy, n is 0, 1 or 2 and Z, Dio, Phe and Cy have the above mentioned meanings.

The LC phases according to the invention preferably contain simultaneously compounds of formula III wherein $A^3$ is Cy and Phe.

The total proportion of the compounds of the formula I and those of formula III, wherein $A^3$ is Cy, is preferably 25 to 60%, in particular 35 to 55%.

The LC phases according to the invention preferably contain at least one compound of formula I, wherein m=1, if all components of formula III have $A^3$=Cy.

$X^1$ is preferably CN or NCS, in particular CN. $X^2$ is preferably fluorine or, in the case of $X^1$=NCS also hydrogen. Z is preferably —CO—O—. $R^1$ is preferably alkyl, alkenyl, alkoxy or alkoxymthyl in each case with 1 to 7 C atoms, in particular alkyl or alkoxymethyl. $(A^o)_m—A^1$ is preferably Phe, CyPhe, PhePhe or PyrPhe, in particular Phe or CyPhe.

Preferred compounds of the formula I are those of the partial formulae Ia to Is:

Ia

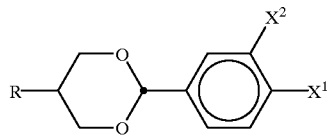

Ib

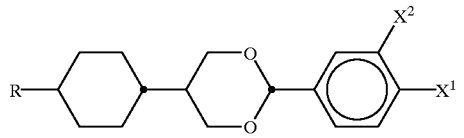

-continued
Ic
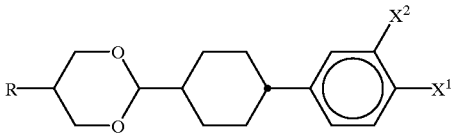
Id
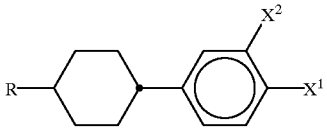
Ie
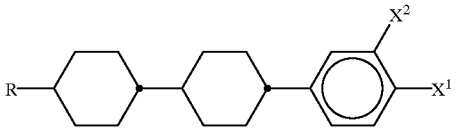
If
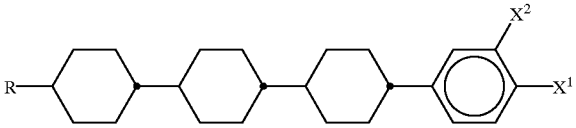
Ig
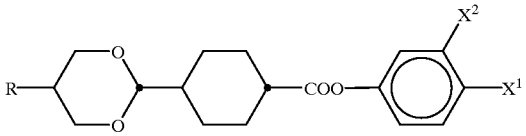
Ih
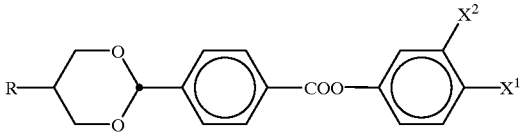
Ii
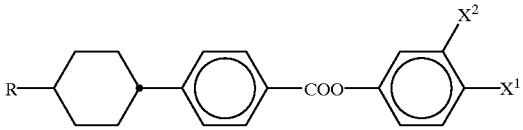
Ij
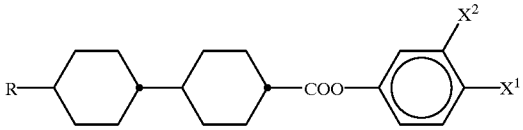
Ik
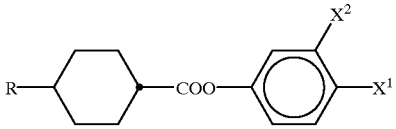
-continued
Il
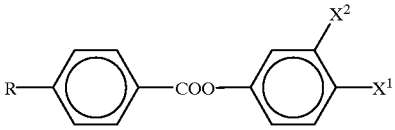
Im
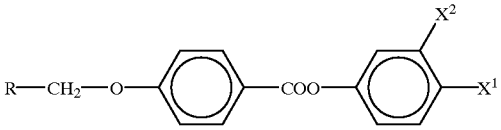
In
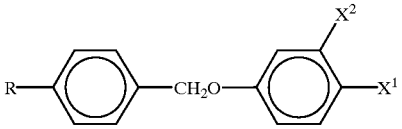
Io
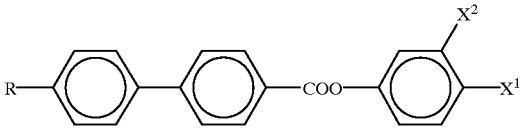
Ip
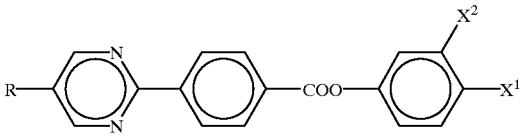
Iq
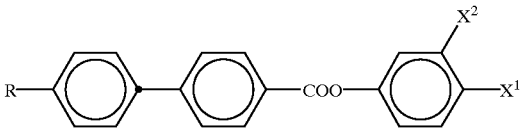
Ir
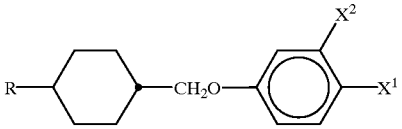
Is
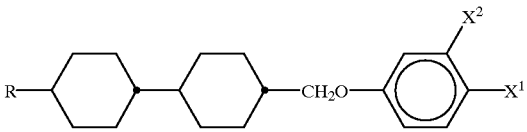
The group
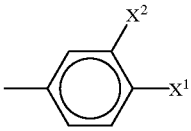

-continued is preferably

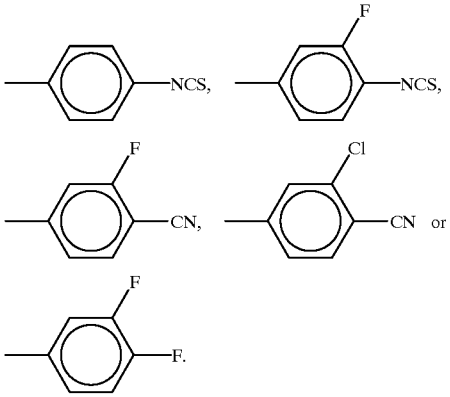

$R^1$ is preferably straight-chain alkyl of 2 to 7 C atoms. Z is in the case of compounds of the formula I preferably —CO—O—, —$CH_2$—O— or a single bond. $X^2$ is preferably fluorine.

Of the foregoing partial formulae, those of the formulae Ia, Ib, Ic, Id, Ie, Ig, Ih, Ii, Ij, Ik, Il, Im, Io, Ip, Ir and Is are preferred. Particular preference is given to those of the partial formulae Ia-Ic, Ig, Ih, Im and Ip.

In the case of the compounds of the foregoing partial formulae, R is a straight-chain alkyl group, preferably of 1 to 7 C atoms, in which in addition a $CH_2$ group can also be replaced by —O— or —CH═CH—. Particularly preferred groups R are methyl, ethyl, n-propyl, n-butyl, n-pentyl and n-heptyl.

In the case of compounds of the foregoing partial formulae with two groups R, both groups R each have independently of each other one of the abovementioned meanings.

In the compounds of the formula III $R^1$ and $R^2$ are each independently preferably alkyl, alkoxy or alkoxymethyl with each up to 7 C atoms.

In the compounds of the formula IV $R^1$ and $R^2$ have the preferred meanings indicated above. Preferred compounds of the formula IV are those of the partial formulae IVa to IVf:

| | |
|---|---|
| $R^1$—Phe—COO—Phe—COO—Phe—$R^2$ | IVa |
| $R^1$—Cy—COO—Phe—COO—Phe—$R^2$ | IVb |
| $R^1$—Phe—COO—Cy—COO—Phe—$R^2$ | IVc |
| $R^1$—Phe—OOC—Cy—COO—Phe—$R^2$ | IVd |
| $R^1$—Cy—COO—Cy—COO—Phe—$R^2$ | IVe |
| $R^1$—Cy—COO—Phe—COO—Cy—$R^2$ | IVf |

Of the foregoing partial formulae, those of the formulae IVa, IVb and IVd are preferred.

Preferred compounds of the formula V are those of the formula Va $R^2$—Dio—Phe—$R^3$ $R^2$ is preferably alkyl with up to 7 C atoms. $R^3$ is preferably alkyl or alkoxy with up to 7 C atoms, fluorine or cyano. Particularly preferred are compounds of the formula Va wherein $R^3$ is cyano.

When the alkyl groups in the compounds of formulae I to V contain 3 or more carbon atoms, these can be arranged in a straight or branched chain. However, the phases according to the invention did not use any components which contain more than one branched alkyl group. Such branched alkyl groups for the purposes of the present invention contain not more than one chain branching; preferably this is a methyl or ethyl group in the 1- or 2-position of carbon skeleton, so that suitable branched alkyl groups are in particular: 2-methylpropyl, 2-methylbutyl, 1-methylpentyl, 2-methylpentyl, 1-methylhexyl. Generally the liquid crystal dielectrics according to the invention contain only one component having a branched-chain alkyl radical in order to induce, if desired, optical activity. For this purpose, normally not more than 10 percent by weight, preferably 0.5 to 3 percent by weight, of a component having a branched alkyl radical are added.

In the compounds of the foregoing partial formulae,

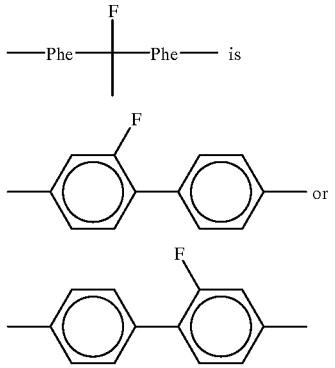

Preferred phases according to the invention contain compounds of the formula III in wich $R^1$ is n-alkyl and $R^2$ is n-alkyl, n-alkoxy or n-alkanoyloxy.

$R^1$ and $R^2$ are preferably n-alkyl or n-alkoxy of in each case 2 to 7 C atoms.

The total proportion of the compounds of the formulae I and II in the LC phases according to the invention is preferably more than 5%, in particular more than 12%. Particularly preferably the LC phases according to the invention have a total proportion of compounds of the formulae I and II of 20 to 80%, in particular 29 to 55% by weight. The total proportion of the compounds of the formula I is preferably 4 to 36%, in particular 10 to 20%.

The total proportion of the compounds of the formula III is preferably 22 to 71%, in particular 38 to 67%. The total proportion of the compounds of the formula IV is preferably 0 to 25%, in particular 4 to 15%.

The total proportion of the compounds of the formula V is preferable 0 to 28%, in particular 0 to 7%.

The preparation of the phases according to the invention is effected in the conventional manner. In general, the desired amount of the components which is used in the smaller amount is dissolved in the components which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example actone, chloroform or methanol, and to remove the solvent after thorough mixing, for example by distillation under reduced pressure. It is self-evident that with this method it must be ensured that the solvent does not introduce any contaminants or undesirable dopants.

By means of suitable additives the liquid crystal phases according to the invention can be modified in such a way that they can be used in any hitherto disclosed kind of liquid crystal display element.

Such additives are known to those skilled in the art and are exhaustively described in the literature. It is possible to add for example conducting salts, preferably ethyldimethyldodecylammonium 4-hexyloxybenzoate, tetrabutylammonium tetraphenylboranate or complex salts of crown ethers (cf. for example I. Haller et al., Mol. Cryst. Liq. Cryst. volume 24, pages 249–258, (1973)) for improving the conductivity of substances for modifying the dielectric anisotropy, the viscosity and/or the orientation of the nematic phases. Such substances are described for example in German Offenlegungsschriften 22 09 127, 22 40 864, 23 21 632, 23 38 281, 24 50 088, 26 37 430, 28 53 728 and 29 02 177.

EXAMPLES

The examples below serve to illustrate the invention without limiting it. In the examples, the melting point and clear point of a liquid crystal substance are given in degrees Celsius. The percentages are by weight. The values of the threshold voltages relate to an angle of observation of 0°, 10% contrast and 20° C.

Example 1

A liquid crystal phase consisting of

10% of 4-cyano-3-fluorophenyl p-ethylbenzoate

9% of 4-cyano-3-fluorophenyl p-propylbenzoate

7% of 2-p-cyanophenyl-5-propyl-1,3-dioxane

20% of 4-cyanobiphenyl-4'-yl trans-4-ethylcyclohexanecarboxylate

10% of 4-propyl-4'-cyanobiphenyl

3% of 4-cyanobiphenyl-4'-yl p-(p-heptylphenyl)benzoate 14.8% of p-pentylphenyl p-methylbenzoate 17.5% of p-pentylphenyl p-propylbenzoate 8.7% of p-pentylphenyl p-pentylbenzoate has a clear point of 61.5°, an optical anisotropy of 0.138, a viscosity of 66.4 mPa.S at 20° and a saturation voltage of 1.35 volt.

Example 2

A liquid crystal phase consisting of

7% of 4-cyano-3-fluorophenyl p-ethylbenzoate

7% of 4-cyanobiphenyl-4'-yl trans-4-ethylcyclohexanecarboxylate

15% of 4-cyano-4'-(trans-4-pentylcyclohexyl)-biphenyl

4% of p-(p-propylhexoxycarbonyl)-phenyl trans-4-ethylcyclohexanecarboxylate 24.3% of p-pentylphenyl p-methylbenzoate 28.4% of p-pentylphenyl p-propylbenzoate 14.3% of p-pentylphenyl p-pentylbenzoate has a clear point of 62.3°, an optical anisotropy of 0.133, a viscosity of 51.9 mPa.S at 20° and a saturation voltage of 2.12 volt.

Example 3

A liquid crystal phase consisting of

10% of 4-cyano-3-fluorophenyl p-ethylbenzoate

10% of 4-cyano-3-fluorophenyl p-propylbenzoate

15% of 4-ethyl-4'-cyanobiphenyl

5% of 2-p-cyanophenyl-5-propyl-1,3-dioxane

20% of 4-cyanobiphenyl-4'-yl trans-4-ethylcyclohexanecarboxylate

2% of p-(p-propylphenoxycarbonyl)-phenyl trans-4-ethylcyclohexanecarboxylate

12% of p-propylphenyl trans-4-propylcyclohexanecarboxylate 14.6% of p-pentylphenyl trans-4-propylcyclohexanecarboxylate and 11.4% of p-heptylphenyl trans-4-propylcyclohexanecarboxylate has a clear point of 60.6°, an optical anisotropy of 0.142, a viscosity of 41.1 mPa.S at 20° and a saturation voltage of 1.39 volt.

Example 4

A liquid crystal phase consisting of

10% of 4-cyano-3-fluorophenyl p-ethylbenzoate

8% of 4-cyanobiphenyl-4'-yl trans-4-ethylcyclohexanecarboxylate

8% of 4-cyano-4'-(trans-4-pentylcyclohexyl)-biphenyl

3% of 4-cyanobiphenyl-4'-yl p-(p-heptylphenyl)benzoate 15.8% of p-pentylphenyl p-methylbenzoate 6.8% of p-pentylphenyl p-propylbenzoate 3.4% of p-pentylphenyl p-pentylbenzoate 14.2% of p-propylphenyl trans-4-propylcyclohexanecarboxylate 17.3% of p-pentylphenyl trans-4-propylcyclohexanecarboxylate and 13.5% of p-heptylphenyl trans-4-propylcyclohexanecarboxylate has a clear point of 60.7°, an optical anisotropy of 0.120, a viscosity of 33.9 mPa.S at 20° and a saturation voltage of 2.11 volt.

Example 5

A liquid crystal phase consisting of

5% of 4-cyano-3-fluorophenyl p-ethylbenzoate

5% of 4-cyano-3-fluorophenyl p-propylbenzoate

10% of 4-ethyl-4'-cyanobiphenyl

15% of 4-butyl-4'-cyanobiphenyl

15% of p-ethoxyphenyl trans-4-propylcyclohexanecarboxylate

15% of p-methoxyphenyl trans-4-butylcyclohexanecarboxylate

10% of p-methoxyphenyl trans-4-pentylcyclohexanecarboxylate

10% of p-ethoxyphenyl trans-4-butylcyclohexanecarboxylate

6% of p-propylphenyl trans-4-(p-propylphenoxycarbonyl)-cyclohexanecarboxylate

5% of p-butylphenyl trans-4-(p-butylphenoxycarbonyl)-cyclohexanecarboxylate and

4% of p-pentylphenyl trans-4-(p-pentylphenoxycarbonyl)-cyclohexanecarboxylate has a clear point of 62°, an optical anisotropy of 0.137, a viscosity of 26 mPa.S at 20° and a threshold voltage of 1.5 volt.

Example 6

A liquid crystal phase consisting of

4% of p-cyanophenyl p-ethylbenzoate

4% of p-cyanophenyl p-propylbenzoate

4% of 4-cyano-3-fluorophenyl p-ethylbenzoate

4% of 4-cyano-3-fluorophenyl p-propylbenzoate

15% of p-trans-4-propylcyclohexyl-benzonitrile

10% of p-trans-4-butylcyclohexyl-benzonitrile

14% of p-ethoxyphenyl trans-4-propylcyclohexanecarboxylate

10% of p-methoxyphenyl trans-4-butylcyclohexanecarboxylate

10% of p-methoxyphenyl trans-4-pentylcyclohexanecarboxylate

10% of p-ethoxyphenyl trans-4-butylcyclohexanecarboxylate

6% of p-(p-butylphenoxycarbonyl)-phenyl p-butylbenzoate

5% of p-propylphenyl trans-4-(p-propylphenoxycarbonyl)cyclohexanecarboxylate and 4% of p-pentylphenyl trans-4-(p-pentylphenoxycarbonyl) cyclohexanecarboxylate has a clear point of 68°, an optical anisotropy of 0.122, a viscosity of 28 mPa.S at 20° and a threshold voltage of 1.7 volt.

Example 7

A liquid crystal phase consisting of

6% of 4-cyano-3-fluorophenyl p-ethylbenzoate

5% of 4-cyano-3-fluorophenyl p-propylbenzoate

10% of 4-cyano-3-fluorophenyl p-pentylbenzoate

15% of 4-cyano-3-fluorophenyl p-heptylbenzoate

15% of p-ethoxyphenyl trans-4-propylcyclohexanecarboxylate

15% of p-methoxyphenyl trans-4-butylcyclohexanecarboxylate

12% of p-methoxyphenyl trans-4-pentylcyclohexanecarboxylate

12% of p-ethoxyphenyl trans-4-butylcyclohexanecarboxylate

5% of p-(p-butylphenoxycarbonyl)-phenyl p-butylbenzoate and

5% of p-(pentylphenoxycarbonyl)-phenyl p-pentylbenzoate has a clear point of 63°, an optical anisotropy of 0.120, a viscosity of 32 mPa.S at 20° and a threshold voltage of 1.3 volt.

Example 8

A liquid crystal phase consisting of

10% of 4-cyano-3-fluorophenyl p-propylbenzoate 0,93% of p-propylphenyl trans-4-propylcyclohexane carboxylate 8,47% of p-pentylphenyl trans-4-propylcyclohexane carboxylate 6,6% of p-heptylphenyl trans-4-propylcyclohexane carboxylate 17% of 4-cyano-biphenyl-4'-yl trans-4-ethylcyclohexane carboxylate 10% of 4-pentyl-2-fluorophenyl trans-4-(trans-4-pentylcyclohexyl)-cyclohexane carboxylate 9% of trans-1-p-cyanophenyl-4-propylcyclohexane 4% of 4-ethyl-4'-cyanobiphenyl 14% of 2-p-cyanophenyl-5-propyl-1,3-dioxane and 14% of 2-p-cyanophenyl-5-pentyl-1,3-dioxane has a clear point of 71°, an optical anisotropy of 0,130 and a viscosity of 44,4 mPa.S at 20°.

Example 9

A liquid crystal phase consisting of

4% of 4-cyano-3-fluorophenyl p-propylbenzoate

16% of 4-cyano-biphenyl-4'-yl trans-4-ethylcyclohexane carboxylate 13,23% of p-propylphenyl trans-4-propylcyclohexane carboxylate 16,17% of p-pentylphenyl trans-4-propylcyclohexane carboxylate 12,6% of p-heptylphenyl trans-4-propylcyclohexane carboxylate 20% of trans-1-p-cyanophenyl-4-propylcyclohexane 13% of 4-pentyl-2-fluorophenyl 4-heptylbiphenyl-4'-carboxylate and 5% of 4-ethyl-4'-cyanobiphenyl has a clear point of 72°, an optical anisotopy of 0,129, and a viscosity of 36,4 mPa.S at 20°.

We claim:

1. A liquid crystal phase consisting essentially of 4 to 36 wt.% of at least one component of the formula I

I

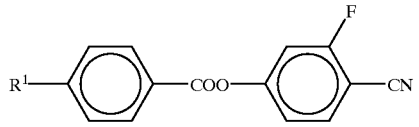

wherein $R^1$ is alkyl of 1 to 12 C atoms; at least one component of the formula II $$R^1—A^2—Phe—CN \qquad II$$

wherein $A^2$ is Cy, Phe, Phe—COO, Cy—COO, Phe—Phe, Phe—COO—Phe, Phe—[PHe] *Phe*—COO—Phe, Cy—Phe or Cy—COO—Phe, Cy is trans-1,4-cyclohexylene, Phe is 1,4-phenylene, and $R^1$ has the meaning indicated above, whereby the total proportion of compounds of the formulae I and II is more than 5 wt.%, 22to 71 wt.% of one or more components of the formula III $$R^1—A^3—COO—Phe—R^2 \qquad III$$

wherein $A^3$ is Cy or Phe, $R^1$ and $R^2$ each are independently alkyl of 1 to 12 C atoms, and Cy and Phe have the meanings indicated above;

0 to 25 wt.% of one or more components of the formula IV and/or VI $$R^1—A^3—(Z^1—A^3)_2—R^2 \qquad IV$$

VI

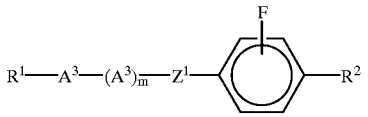

wherein $Z^1$ independently is —CO—O— or —O—CO—, m is 0 or 1 and $R^1$, $R^2$ and $A^3$ independently have the meanings indicated above;

and 0 to 28 wt.% of compounds of the formula Va $R^1$—Dio—Phe—CN Va wherein $R^1$ is alkyl of 1 to 7 C atoms, Dio is trans-1,3-dioxane-2,5-diyl and Phe is 1,4-phenylene.

2. A liquid crystal phase according to claim 1, wherein said phase contains simultaneously compounds of formula III wherein $A^3$ is Cy and Phe.

3. A liquid crystal phase according to claim 1, wherein said phase contains compounds of the formula IV selected from the following formulae IVa to IVf $R^1$—Phe—COO—Phe—COO—Phe—$R^2$ IVa $R^1$—Cy—COO—Phe—COO—Phe—$R^2$ IVb $R^1$—Phe—COO—Cy—COO—Phe—$R^2$ IVc $R^1$—Phe—OOC—Cy—COO—Phe—$R^2$ IVd $R^1$—Cy—COO—Cy—COO—Phe—$R^2$ IVe $R^1$—Cy—COO—Phe—COO—Cy—$R^2$ IVf.

4. A liquid crystal phase according to claim 1, wherein said phase consists essentially of 10% of 4-cyano-4-fluorophenyl p-ethylbenzoate 9% of 4-cyano-3-fluorophenyl p-propylbenzoate 7% of 2-p-cyanophenyl-5-propyl-1,3-dioxane 20% of 4-cyanobiphenyl-4'-yl trans-4-ethylcyclohexanecarboxylate 10% of 4-propyl-4'-cyanobiphenyl 3% of 4-cyanobiphenyl-4'-yl p-(p-heptylphenyl)-benzoate 14.8% of p-pentylphenyl p-methylbenzoate 17.5% of p-pentylphenyl p-propylbenzoate 8.7% of p-pentylphenyl p-pentylbenzoate.

5. A liquid crystal phase according to claim 1, wherein said phase consists essentially of 7% of 4-cyano-3-fluorophenyl p-ethylbenzoate 7% of 4-cyanobiphenyl-4'-yl trans-4-ethylcyclohexanecarboxylate 15% of 4-cyano-4'-(trans-4-pentylcyclohexyl)-biphenyl 4% of p-(p-propylhexoxycarbonyl)-phenyl trans-4-ethylcyclohexanecarboxylate 24.3% of [pe-pentylphenyl] *p-pentylphenyl* p-methylbenzoate 28.4% of p-pentylphenyl p-pentylbenzoate 14.3% of p-pentylphenyl p-pentylbenzoate.

6. A liquid crystal phase according to claim 1, wherein said phase consists essentially of 10% of 4-cyano-3-fluorophenyl p-ethylbenzoate 10% of 4-cyano-3-fluorophenyl p-propylbenzoate 15% of 4-ethyl-4'-cyanobiphenyl 5% of 2-p-cyanophenyl-5-propyl-1,3-dioxane 20% of 4-cyanobiphenyl-4'-yl trans-4-ethylcyclohexanecarboxylate 2% of p-(p-propylphenoxycarbonyl)-phenyl trans-4-ethylcyclohexanecarboxylate 12% of p-propylphenyl trans-4-propylcyclohexanecarboxylate 14.6% of p-pentylphenyl trans-4-propylcyclohexanecarboxylate and 11.4% of p-heptylphenyl trans-4-propylcyclohexanecarboxylate.

7. A liquid crystal phase according to claim 1, wherein said phase consists essentially of 10% of 4-cyano-3-fluorophenyl p-ethylbenzoate 8% of 4-cyanobiphenyl-4'-yl trans-4-ethylcyclohexanecarboxylate 8% of 4-cyano-4'-(trans-4-pentylcyclohexyl)-biphenyl 3% of 4-cyanobiphenyl-4'-yl p-(p-heptylphenyl)-benzoate 15.8% of p-pentylphenyl p-methylbenzoate 6.8% of p-pentylphenyl p-propylbenzoate 3.4% of p-pentylphenyl p-pentylbenzoate 14.2% of p-propylphenyl trans-4-propylcyclohexanecarboxylate 17.3% of p-pentylphenyl trans-4-propylcyclohexanecarboxylate and 13.5% of p-heptylphenyl trans-4-propylcyclohexanecarboxylate.

8. A liquid crystal phase [according to claim 1, wherein said phase consists] *consisting* essentially of 5% of 4-cyano-3-fluorophenyl p-ethylbenzoate 5% of 4-cyano-3-fluorophenyl p-propylbenzoate 10% of 4-ethyl-4'-cyanobiphenyl 15% of 4-butyl-4'-cyanobiphenyl 15% of p-ethoxyphenyl trans-4-propylcyclohexanecarboxylate 15% of p-methoxyphenyl trans-4-butylcyclohexanecarboxylate 10% of p-methoxyphenyl trans-4-pentylcyclohexanecarboxylate 10% of p-ethoxyphenyl trans-4-butylcyclohexanecarboxylate 6% of p-propylphenyl trans-4-(p-propylphenoxycarbonyl)cyclohexanecarboxylate 5% of p-butylphenyl trans-4-(p-butylphenoxycarbonyl) cyclohexanecarboxylate and 4% of p-pentylphenyl trans-4-(p-pentylphenoxycarbonyl) cyclohexanecarboxylate.

9. A liquid crystal phase [according to claim 1, wherein said phase consists] *consisting* essentially of 4% of p-cyanophenyl p-ethylbenzoate 4% of p-cyanophenyl p-propylbenzoate 4% of 4-cyano-3-fluorophenyl p-ethylbenzoate 4% of 4-cyano-3-fluorophenyl p-propylbenzoate 15% of [p-trans-4-propylcylcohexyl-benzonitrile] *p-trans-4-propylcyclohexyl-benzonitrile*

10% of p-trans-4-butylcyclohexyl-benzonitrile

14% of p-ethoxyphenyl trans-4-propylcyclohexanecarboxylate

10% of p-methoxyphenyl trans-4-butylcyclohexanecarboxylate

10% of p-methoxyphenyl trans-4-pentylcyclohexanecarboxylate

10% of p-ethoxyphenyl trans-4-butylcyclohexanecarboxylate

6% of p-(p-butylphenoxycarbonyl)-phenyl p-butylbenzoate

5% of p-propylphenyl trans-4-(p-propylphenoxycarbonyl)cyclohexane carboxylate and 4% of p-pentylphenyl trans-4-(p-pentylphenoxycarbonyl) cyclohexane carboxylate.

10. A liquid crystal phase [according to claim 1, wherein said phase consists] *consisting* essentially of 10% of 4-cyano-3-fluorophenyl p-propylbenzoate 0.93% of p-propylphenyl trans-4-propylcyclohexane carboxylate 8.47% of p-pentylphenyl trans-4-propylcyclohexane carboxylate 6.6% of p-heptylphenyl trans-4-propylcyclohexane carboxylate 17% of 4-cyano-biphenyl-4'-yl trans-4-ethylcyclohexane carboxylate 10% of 4-pentyl-2-fluorophenyl trans-4-(trans-4-pentylcyclohexyl)-cyclohexane carboxylate 9% of trans-1-p-cyanophenyl-4-propylcyclohexane 4% of 4-ethyl-4'-cyanobiphenyl 14% of 2-p-cyanophenyl-5-propyl-1,3-dioxane and 14% of 2-p-cyanophenyl-5-pentyl-1,3-dioxane.

11. A liquid crystal phase according to claim 1, wherein said phase consists essentially of 4% of 4-cyano-3-fluorophenyl p-propylbenzoate 16% of 4-cyano-biphenyl-4'-yl trans-4-ethylcyclohexane carboxylate 13.23% of p-propylphenyl trans-4-propylcyclohexane carboxylate 16.17% of p-pentylphenyl trans-4-propylcyclohexane carboxylate

[b] 12.6% of p-heptylphenyl trans-4-propylcyclohexane carboxylate

20% of trans-1-p-cyanophenyl-4-propylcyclohexane

13% of 4-pentyl-2-fluorophenyl 4-heptylbiphenyl-4'-carboxylate and

5% of 4-ethyl-4'-cyanobiphenyl.

12. In an electrooptical display element containing a liquid crystal phase, the improvement wherein said phase is a phase according to claim 1.

13. A liquid crystal phase according to claim 1, wherein the total proportion of compounds of formula I is 10–20 wt.%.

14. A liquid crystal phase according to claim 1, wherein the total proportion of compounds of formulae I and II is 29–55 wt.%.

15. A liquid crystal phase according to claim 1, wherein the total proportion of the components of formula III is 38–67 wt.%.

16. A liquid crystal phase according to claim 1, wherein the total proportion of the components of formula IV is 4–15 wt.%.

17. A liquid crystal phase according to claim 1, wherein the total proportion of the compounds of formula Va is 0–7 wt.%.

18. A liquid crystal phase according to claim 1, wherein the total proportion of compounds of formulae I and II is more than 12 wt.%.

19. A liquid crystal phase according to claim 1, wherein the total proportion of compounds of formulae I and II is 20–80 wt.%.

* * * * *